(12) United States Patent
Liang et al.

(10) Patent No.: US 10,839,782 B2
(45) Date of Patent: Nov. 17, 2020

(54) EXTERNAL EXTENDED DEVICE AND AUDIO PLAYBACK METHOD

(71) Applicant: Beijing Xiaomi Mobile Software Co., Ltd., Beijing (CN)

(72) Inventors: Xin Liang, Beijing (CN); Yukun Fei, Beijing (CN); Zhongwen Wen, Beijing (CN); Guiming Long, Beijing (CN); Ming Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 343 days.

(21) Appl. No.: 15/636,656

(22) Filed: Jun. 29, 2017

(65) Prior Publication Data
US 2018/0012581 A1    Jan. 11, 2018

(30) Foreign Application Priority Data
Jul. 7, 2016   (WO) ................. PCT/CN2016/089161

(51) Int. Cl.
*H04B 1/00*     (2006.01)
*G10H 1/36*     (2006.01)
(Continued)

(52) U.S. Cl.
CPC ............... *G10H 1/361* (2013.01); *G09B 5/00* (2013.01); *G10H 2220/211* (2013.01);
(Continued)

(58) Field of Classification Search
CPC .......... G10H 1/36; G10H 1/361; G10H 1/363; G10H 1/365; G10H 1/366; G10H 1/368;
(Continued)

(56) References Cited

U.S. PATENT DOCUMENTS 6,999,827 B1 * 2/2006 Yong ................. H04H 20/95
381/58
2003/0125933 A1 * 7/2003 Saunders ................. G09B 5/04
704/201

(Continued)

FOREIGN PATENT DOCUMENTS

CN    201035970 Y    3/2008
CN    201251919 Y    6/2009
(Continued)

OTHER PUBLICATIONS

CP2114 "USBXpressTM USB Audio to I2S Digital Audio Bridge Family CP2114 Data Sheet, Rev 1.2" by Silicon Labs, p. 1-58, April . (Year: 2016).*

(Continued)

*Primary Examiner* — Leshui Zhang
(74) *Attorney, Agent, or Firm* — Jun He Law Offices P.C.; James J. Zhu

(57) ABSTRACT

An external extended device, an audio processing method and an audio playback method are provided. The external extended device is configured to receive power supplied and a signal transmitted by a television device and the external extended device includes: an integrated physical interface connecting the external extended device and the television device; and a sound-mixing processing chip electrically connected with the integrated physical interface and configured to: acquire an accompaniment audio signal transmitted by the television device via the integrated physical interface; perform sound-mixing processing on a user voice signal gathered by a microphone device and the accompaniment audio signal; and transmit a sound-mixed signal to a power amplifier circuit of the television device via the integrated physical interface.

13 Claims, 10 Drawing Sheets

(51) Int. Cl.
*G09B 5/00* (2006.01)
*H04N 5/765* (2006.01)
*H04N 21/422* (2011.01)

(52) U.S. Cl.
CPC . *G10H 2240/011* (2013.01); *G10H 2240/171* (2013.01); *G10H 2240/201* (2013.01); *G10H 2240/271* (2013.01); *G10H 2240/325* (2013.01); *H04N 5/765* (2013.01); *H04N 21/42203* (2013.01)

(58) Field of Classification Search
CPC ....... G10H 2220/211; G10H 2240/011; G10H 2240/016; G10H 2240/021; G10H 2240/026; G10H 2240/031; G10H 2240/036; G10H 2240/171; G10H 2240/201; G10H 2240/271; G10H 2240/275; G10H 2240/325; G10H 2220/00; G10H 2220/145; G10H 2220/011; H04N 5/765; H04N 5/775; H04N 5/7755; H04N 5/76; H04N 5/7605; H04N 21/42203; G06F 16/5866; G06F 16/78; G06F 16/7867; G06F 3/16; G06F 16/7834; G08B 13/19671; G03B 31/00; G03B 31/06; G03B 31/08; G10K 2210/1051; G11B 2020/10546; G11B 2020/10555; G11B 2020/10564; G11B 2020/10574; G11B 2020/10583; G11B 2020/10601
USPC ....... 381/119, 122, 110, 86, 333, 61, 27, 26, 381/300–311, 22, 23, 21, 20, 19, 18, 17; 700/94
See application file for complete search history.

(56) References Cited

U.S. PATENT DOCUMENTS

| | | | |
|---|---|---|---|
| 2004/0165119 A1* | 8/2004 | Choi ................. | H04N 5/44 348/839 |
| 2008/0053683 A1* | 3/2008 | Strauser ............ | H04N 5/607 348/E5.125 |
| 2008/0187155 A1 | 8/2008 | Hou | |
| 2009/0098902 A1* | 4/2009 | Kong ................. | H04N 5/60 348/632 |
| 2011/0242430 A1 | 10/2011 | Qi et al. | |
| 2013/0202268 A1 | 8/2013 | Su | |

FOREIGN PATENT DOCUMENTS

| | | | |
|---|---|---|---|
| CN | 202190332 | U | 4/2012 |
| CN | 103561298 | A | 2/2014 |
| CN | 103974168 | A | 8/2014 |
| CN | 104461989 | A | 3/2015 |
| CN | 204231580 | U | 3/2015 |
| EA | 000572 | B1 | 12/1999 |
| EP | 1966938 | A2 | 9/2008 |
| JP | 04-135799 | A | 5/1992 |
| JP | 08-016180 | A | 1/1996 |
| JP | 3082617 | U | 10/2001 |
| JP | 2008233926 | A | 10/2008 |
| JP | 3176560 | U | 6/2012 |
| KR | 20090085778 | A | 8/2009 |
| RU | 2178922 | C1 | 1/2002 |
| RU | 2006144302 | A | 6/2008 |
| RU | 2007114081 | A | 10/2008 |
| WO | 2009002195 | A2 | 12/2008 |
| WO | 2009140024 | A2 | 11/2009 |
| WO | 2016082150 | A1 | 6/2016 |

OTHER PUBLICATIONS

MiniDSPTM, "2x4 Kit User Manual", v2.2, pp. 1-46, May 15 (Year: 2015).*
USBStreamerTM, "USBStreamer User Manual" v1.0-v1.4, pp. 1-33, Mar. 25, (Year: 2016).*
MiniSTREAMERTM, miniStreamer user manual v.1.2, pp. 1-7, Mar. 29, (Year: 2012).*
Office Action in Japanese application No. 2017-510558, dated Sep. 4, 2018.
minidsp.com, "miniSTREAMER User Manual V1.1", May 23, 2011 (May 23, 2011), pp. 1-7, Online: https://www.minidsp.com/images/documents/miniSTREAMER Manual.pdf.
Gal Ashour et al, "USB Device Class Definition for Audio Devices; Universal Serial Bus", Mar. 18, 1998 (Mar. 18, 1998), pp. 1-130, Online: http://www.usb.org/developers/docs/devclass_docs/audio10.pdf.
Anonym, "Q-MIX2 2 Channel Compact Mixer_User Manual", 172.800UK, Jan. 1, 2014 (Jan. 1, 2014), pp. 1-4, United Kingdom, Online: http://avslgroup.com:80/assets/manuals/1/7/172800UK.pdf.
Extended European Search Report for European Application No. 17176766.8, dated Sep. 13, 2017.
First Office Action of RU Application No. 2017120357/08(035319) dated May 11, 2018.
The Office Action in Japanese application No. 2017510558, dated Feb. 19, 2019.
The First Office Action in Chinese Patent Application No. 201680000731.3, dated Aug. 16, 2019.
International Search Report in PCT Application No. PCT/CN2016/089161, dated Mar. 29, 2017.

* cited by examiner

EXTERNAL EXTENDED DEVICE AND AUDIO PLAYBACK METHOD

CROSS REFERENCE

The present application is based on and claims the priority of PCT Patent Application No. PCT/CN2016/089161, filed Jul. 7, 2016, the entire contents of which are incorporated herein by reference.

TECHNICAL FIELD

The present disclosure relates to the field of audio processing, and more particularly, to an external extended device and an audio playback method.

BACKGROUND

Karaoke is a way of leisure and entertainment well received by users. To allow the users to experience the Karaoke at home, more and more televisions begin to support Karaoke functions.

When a user is singing using the Karaoke functions of a television, a Karaoke processing chip built in the television acquires a user voice signal by means of a microphone connected with the television, fuses the user voice signal and an accompaniment audio signal, performs sound-mixing processing on a fused audio signal, and finally plays the sound-mixed signal back by means of a power amplifier of the television, thereby achieving a professional Karaoke effect. However, it is costly to build the Karaoke processing chip in the television and it is disadvantageous to upgrade.

SUMMARY

The present disclosure provides an external extended device and an audio playback method.

In a first aspect, there is provided an external extended device. The external extended device is configured to receive power supplied and a signal transmitted by a television device and includes: an integrated physical interface connecting the external extended device and the television device; a sound-mixing processing chip electrically connected with the integrated physical interface and configured to: acquire an accompaniment audio signal transmitted by the television device via the integrated physical interface; perform sound-mixing processing on a user voice signal gathered by a microphone device and the accompaniment audio signal; and transmit a sound-mixed signal to a power amplifier circuit of the television device via the integrated physical interface.

In a second aspect, there is provided an audio playback method, used in an external extended device. The method includes: acquiring a user voice signal gathered by a microphone device; receiving an accompaniment audio signal transmitted by a television device via an integrated physical interface between the external extended device and the television device; performing sound-mixing processing on the user voice signal and the accompaniment audio signal; and transmitting, via the integrated physical interface, a sound-mixed signal to a power amplifier circuit of the television device via the integrated physical interface, wherein the television device is configured to playing back the sound-mixed signal received by the power amplifier circuit via a built-in speaker.

In a third aspect, there is provided an audio playback method, used in a television device. The method includes: transmitting an accompaniment audio signal to an external extended device via an integrated physical interface between the television device and the external extended device; receiving a sound-mixed signal transmitted by the external extended device to a power amplifier circuit of the television device via the integrated physical interface, wherein the sound-mixed signal is generated after the external extended device performs sound-mixing processing on a user voice signal gathered by a microphone device and the accompaniment audio signal; and playing back the sound-mixed signal received by the power amplifier circuit via a built-in speaker.

It is to be appreciated that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
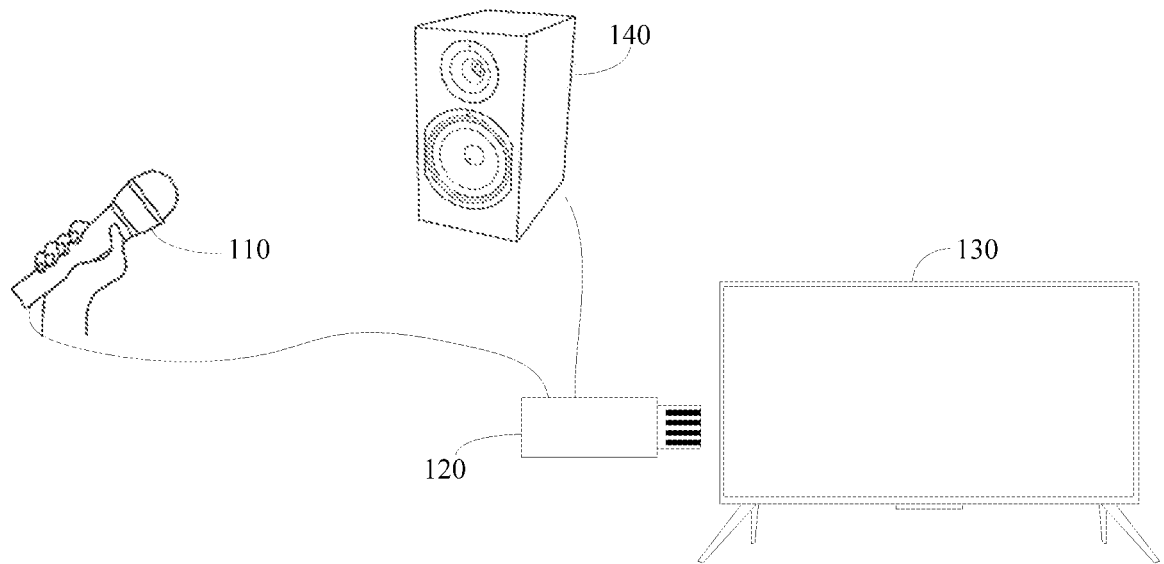
FIG. 1 illustrates a block diagram of an audio playback system according to an exemplary embodiment.

FIG. 1 illustrates a block diagram of an audio playback system according to an exemplary embodiment. The audio playback system includes a microphone device 110, an external extended device 120 and a television device 130.

The microphone device 110 is configured to gather a user voice signal and transmit the user voice signal to the external extended device 120. For example, the microphone device 110 may be a microphone connected with the external extended device 120 via a cable.

The microphone device 110 is connected with the external extended device 120 either wired or wirelessly.

The external extended device 120 is an electronic device having audio processing and transmitting functions. The external extended device 120 includes an integrated physical interface and is electrically connected with the television device 130 via the integrated physical interface to receive power supplied by the television device 130 and carry out signal transmission with the television device 130. The integrated physical interface may be a USB2.0 interface, a USB3.0 interface, a Type C interface or a lightning interface, and the like. For example, as shown in FIG. 1, the external extended device 120 may be implemented as a USB device provided with the USB3.0 interface. The external extended device could be understood as a peripheral device.

The television device 130 is an electronic device having video & audio playback functions, which may be a smart television or a projector with a loudspeaker, etc. The television device 130 is configured to receive a sound-mixed signal transmitted by the external extended device 120 and play the sound-mixed signal back by means of a built-in speaker, where the sound-mixed signal is generated according to a user voice signal and an accompaniment audio signal. The television device 130 also may be implemented as a combination of a smart TV box+a television, and the external extended device 120 is connected with the smart TV box via the integrated physical interface.

In some embodiments, the audio playback system may further include an external power amplifier 140 connected with the external extended device 120.

The external power amplifier 140 may be a speaker box connected with the external extended device 120 and is configured to receive a sound-mixed signal transmitted by the external extended device 120 and play the sound-mixed signal back.

Figure 2A:
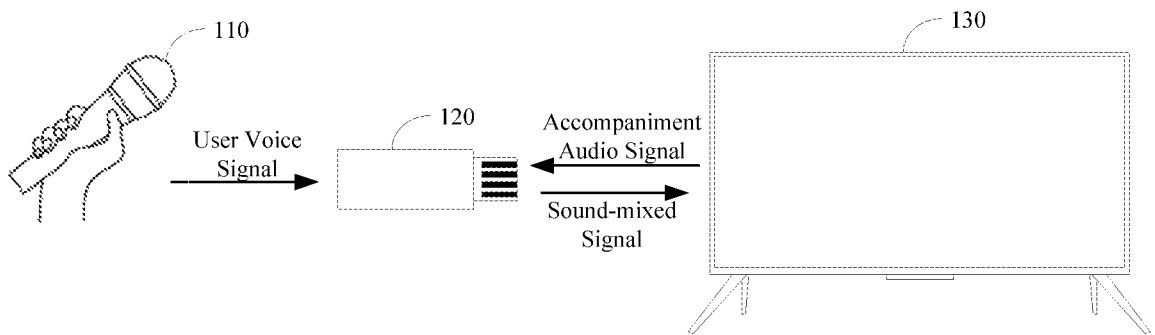
FIG. 2A is a schematic diagram of a signal transmission mode for the audio playback system as shown in FIG. 1.

When Karaoke is carried out by the audio playback system as shown in FIG. 1, as shown in FIG. 2A, the microphone device 110 is configured to transmit a gathered user voice signal to the external extended device 120.

When Karaoke is carried out, the microphone device is configured to gather a user voice signal and transmit, in real time, the gathered user voice signal to the external extended device 120 by means of a connection between the microphone device and the external extended device.

The television device 130 is configured to transmit an accompaniment audio signal to the external extended device 120 via the integrated physical interface.

After the external extended device is connected with the television device via the integrated physical interface, the television device supplies power for the external extended device via the integrated physical interface, and transmits an accompaniment audio signal to the external extended device via the integrated physical interface when a user is singing, so that the external extended device may carry out sound-mixing processing according to the user voice signal and the accompaniment audio signal.

The external extended device 120 is configured to perform sound-mixing processing on the user voice signal and the accompaniment audio signal to generate a sound-mixed signal, and transmit the sound-mixed signal to a power amplifier circuit of the television device 130 via the integrated physical interface.

After receiving the user voice signal and the accompaniment audio signal, the external extended device fuses the user voice signal and the accompaniment audio signal, and performs sound-mixing processing on the fused sound signal to generate a corresponding sound-mixed signal. After generating the sound-mixed signal, the external extended device returns the sound-mixed signal to the television device via the integrated physical interface and the sound-mixed signal is played back by means of a built-in speaker of the television device. To reduce a delay, the sound-mixed signal transmitted via the integrated physical interface is directly transmitted to the power amplifier circuit of the television device without through the AP of the television device (a larger delay may exist if the sound-mixed signal is transmitted to the power amplifier circuit through the AP).

To allow the built-in speaker of the television device to directly play the received sound-mixed signal back, in a possible implementation, the integrated physical interface between the external extended device 120 and the television device 130 includes an Inter-IC Sound (I2S) subinterface (configured to transmit an I2S signal). The television device transmits an accompaniment audio signal to the external extended device via the I2S subinterface, and the external extended device 120 directly transmits a sound-mixed signal to a power amplifier circuit of the television device via the I2S subinterface.

In other possible implementations, the I2S subinterface also may be replaced with a Pulse Code Modulation (PCM) subinterface, which is not limited in this embodiment.

The television device 130 is further configured to play back the sound-mixed signal received by the power amplifier circuit via a built-in speaker.

The television device receives a sound-mixed signal transmitted by the external extended device via a built-in power amplifier circuit and uses the built-in speaker to play the sound-mixed signal back. Since the sound-mixed signal is directly transmitted to the power amplifier circuit instead of being transmitted to the power amplifier circuit through the AP of the television device, in user experience, a delay between singing by the user and playing the sound-mixed signal back by the television device is smaller, and thus the user experience is good.

The I2S signal transmitted via the I2S subinterface not only includes data but also includes a corresponding clock signal. Therefore, in a possible implementation, the integrated physical interface between the external extended device and the television device is a USB3.0 interface, namely, the external extended device is provided with a USB3.0 male plug, and the television device is provided with a USB3.0 female plug.

USB2.0 pins in the USB3.0 interface are configured to constitute a USB2.0 subinterface, and USB3.0 pins in the USB3.0 interface (for example the remaining pins which are not USB2.0 pins) are configured to constitute the I2S subinterface. When signal transmission is carried out between the external extended device and the television device, signal transmission (the accompaniment audio signal and the sound-mixed signal) is carried out via the I2S subinterface constituted by the USB3.0 pins.

Specifically, the USB3.0 pins include a first pin, a second pin, a third pin, a fourth pin and a fifth pin, wherein the first pin is configured to transmit an SCK signal, the second pin is configured to transmit a WS signal, the third pin is configured to transmit an SD IN, the fourth pin is configured to transmit an SD OUT, and the fifth pin is configured to transmit any one signal of an MCLK signal, the SD IN and the SD OUT.

The SCK signal is used for synchronous data transmission, thereby avoiding an error caused by clock asynchronization when a receiving end receives the I2S signal. The WS signal is used for indicating a right channel and a left channel of the data in the I2S signal. The SD IN is input data, and the SD IN includes data of the right channel and the left channel. The SD OUT is output data, and the SD OUT also includes data of the right channel and the left channel. The fifth pin may be configured to transmit the MCLK signal, the SD IN or the SD OUT. When the fifth pin transmits the SD IN or the SD OUT, the television device may transmit a quadraphonic accompaniment audio signal to the external extended device via the I2S subinterface. Correspondingly, the external extended device may return a quadraphonic sound-mixed signal to the television device via the I2S subinterface, and finally a quadraphonic playback is achieved.

Figure 2B:
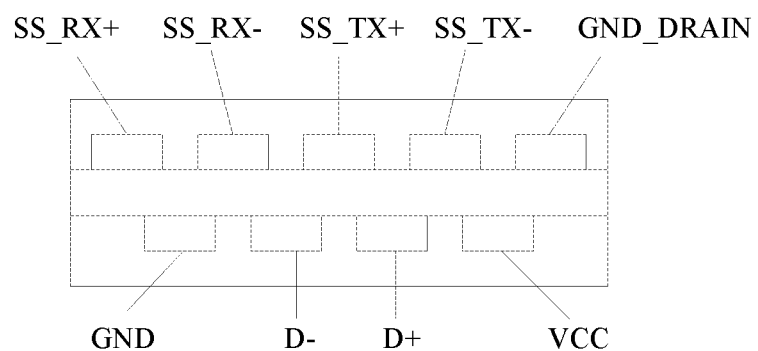
FIG. 2B is a schematic diagram of an integrated physical interface according to an embodiment.

For example, as shown in FIG. 2B, the integrated physical interface is the USB3.0 interface, where a GND pin, a D− pin, a D+ pin and a VCC pin in the USB3.0 interface constitute a USB2.0 subinterface. An SS_RX+ pin, an SS_RX− pin, an SS_TX+ pin, an SS_TX− pin, and a GND_DRAIN pin in the USB3.0 interface constitute the I2S subinterface, and are respectively configured to transmit the SCK signal, the WS signal, the SD IN, the SD OUT and the MCLK signal.

The integrated physical interface (a female plug) on the television device not only may be connected with the external extended device but also may be connected with other external devices. When the television device is connected with the external extended device, the television device carries out signal transmission with the external extended device via the I2S subinterface. When the television device is connected with other external devices (for example, standard USB3.0 devices), corresponding pins of the I2S subinterface likely may be not configured to transmit the I2S signal.

Therefore, to avoid a signal transmission error and prevent the integrated physical interface from being damaged, in a possible implementation, the I2S subinterface in the integrated physical interface has an on state and an off state. When the television device is connected with the external extended device, the I2S subinterface is in the on state, and the I2S subinterface can transmit the I2S signal. When the television device is not connected with the external extended device, the I2S subinterface is in the off state, and the I2S subinterface prohibits transmitting the I2S signal. Specifically, the television device 130 is configured to acquire a device identifier of an external device when detecting that the television device is connected with the external device via the integrated physical interface.

When detecting that the television device is connected with an external device, the television device acquires a device identifier of the external device and detects whether the device identifier is the same as that of the external extended device.

In a possible implementation, the television device determines a device type of the external device according to the acquired device identifier, wherein the device type may include a standard USB3.0 device and the external extended device, etc.

The television device 130 is further configured to set the I2S subinterface as the on state in case that the device identifier indicates that the external device is the external extended device 120.

The I2S subinterface is set as the on state when the acquired device identifier indicates that the connected external device is the external extended device since the television device carries out signal transmission via the I2S subinterface.

The television device 130 is further configured to set the I2S subinterface as the off state in case that the device identifier indicates that the external device is not the external extended device 120.

The I2S subinterface is set as the off state (pins corresponding to the I2S subinterface is in a high impedance state) when the acquired device identifier indicates that the connected external device is not the external extended device since the pins corresponding to the I2S subinterface is not configured to carry out signal transmission.

In some embodiments, the television device may also switch between different pin modes according to a type of the external device. For example, when the device identifier indicates that the external device is the external extended device, the television device switches the integrated physical interface to a first pin mode, and the I2S subinterface is enabled in the first pin mode. When the device identifier indicates that the external device is the standard USB3.0 device, the television device switches the integrated physical interface to a second pin mode, the I2S subinterface is switched to a standard USB3.0 subinterface in the second pin mode, and the integrated physical interface may be used as a standard USB interface for data transmission with a standard USB device.

In some embodiments, the external extended device 120 is further configured to transmit the sound-mixed signal to an AP of the television device 130 via the I2S subinterface in the integrated physical interface, wherein the AP is configured to save the sound-mixed signal as a recording.

After the user sings, replay is likely needed. The external extended device transmits the sound-mixed signal to the power amplifier circuit of the television device, and simultaneously, the external extended device may also transmit the sound-mixed signal to the AP of the television device via the I2S subinterface. After receiving the sound-mixed signal, the AP of the television device saves the sound-mixed signal as a recording. When the user indicates to replay the recording, the television device plays the recording back. The external extended device may also transmit a user voice signal gathered by the microphone device to the AP of the television device so that the user may replay sound without the accompaniment, which is not limited in the embodiments of the present disclosure.

When the integrated physical interface is a USB3.0 interface, signal transmission between the television device and the external extended device may be carried out via not only the I2S subinterface but also a USB2.0 subinterface in the USB3.0 interface, and audio-play can be performed by means of an external power amplifier.

Figure 2C:
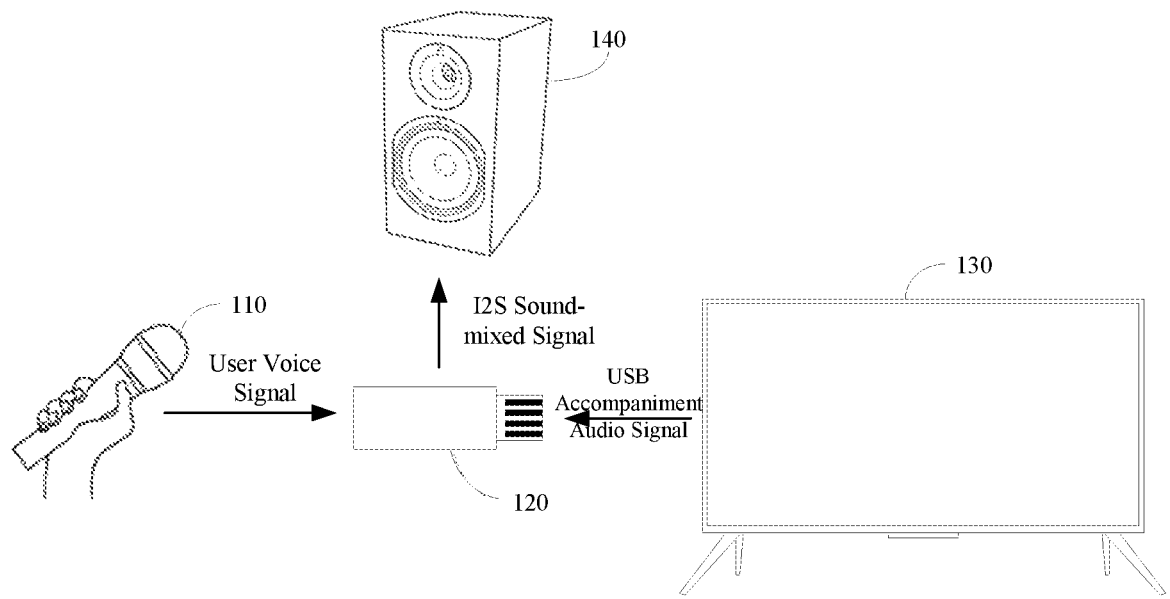
FIG. 2C is a schematic diagram of another signal transmission mode for the audio playback system as shown in FIG. 1.

In a possible implementation, as shown in FIG. 2C, the television device is further configured to transmit a USB accompaniment audio signal to the external extended device via the USB2.0 subinterface by calling a USB Audio Class (UAC).

When the television device supports the UAC and detects that the external extended device is connected with the television device, the television device transmits the USB accompaniment audio signal to the external extended device via the USB2.0 subinterface.

The external extended device is further configured to convert the USB accompaniment audio signal into an I2S accompaniment audio signal by means of a bridge chip, perform sound-mixing processing on the user voice signal and the I2S accompaniment audio signal, convert an I2S sound-mixed signal into a USB sound-mixed signal by means of the bridge chip, and transmit the USB sound-mixed signal to the AP of the television device via the USB2.0 subinterface by calling the UAC, wherein the AP is configured to save the USB sound-mixed signal as a recording.

Correspondingly, the external extended device receives the USB accompaniment audio signal transmitted by the television device via the USB2.0 subinterface in the integrated physical interface. For the received USB accompaniment audio signal, the external extended device converts the USB accompaniment audio signal into the I2S accompaniment audio signal by means of a built-in bridge chip, wherein the bridge chip is configured to convert an I2S signal and a USB audio signal.

The external extended device performs sound-mixing processing on the user voice signal transmitted by the microphone device and the I2S accompaniment audio signal obtained by conversion to generate a corresponding I2S sound-mixed signal.

To achieve return of a sound-mixed signal, after processing the obtained I2S sound-mixed signal, the external extended device needs to reuse the bridge chip to convert the I2S sound-mixed signal into a USB sound-mixed signal and return the USB sound-mixed signal to the AP of the television device via the USB2.0 subinterface.

If the AP of the television device processes the received USB sound-mixed signal and transmits the USB sound-mixed signal via the power amplifier circuit to the built-in speaker to play the USB sound-mixed signal back, a larger delay (greater than 30 ms) will be generated, which causes an apparent lag of the audio signal played back by the built-in speaker, thereby affecting the user experience. Therefore, after receiving the returned USB sound-mixed signal, the AP of the television device saves the USB sound-mixed signal as a recording for subsequent replay and use.

When the integrated physical interface is a USB2.0 interface, the external extended device and the television device may also implement signal transmission by means of the foregoing method. In this embodiment, a schematic description is made merely by taking an example in which the integrated physical interface is a USB3.0 interface, and the present disclosure is not limited herein.

The external extended device is further configured to transmit the I2S sound-mixed signal to the external power amplifier via a Line Out interface or a SONY/PHILIPS Digital Interface Format (SPDIF).

The external power amplifier is configured to play back the received I2S sound-mixed signal.

To allow the user to hear the sound-mixed audio signal, the external extended device is also provided with a Line Out interface or an SPDIF. After completion of the sound-mixing processing, the external extended device may transmit the I2S sound-mixed signal to the external power amplifier via the Line Out interface or the SPDIF so that the external power amplifier may play the audio signal back. Meanwhile, since the I2S sound-mixed signal is not transmitted through the AP, a delay between singing by the user and playing the audio signal back by the external power amplifier is smaller, and thus the user experience is good.

Figure 3:
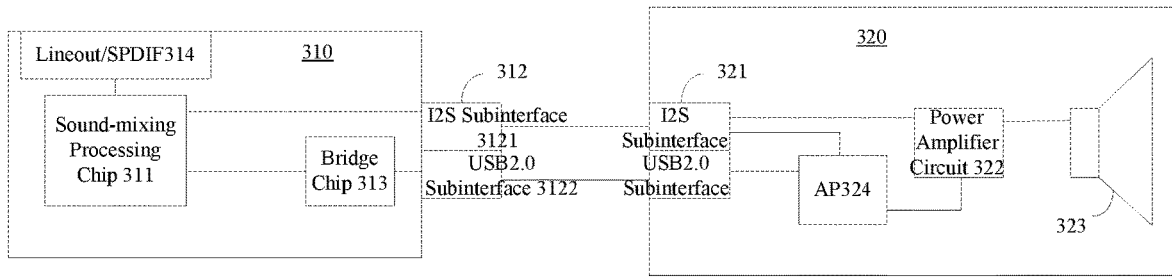
FIG. 3 illustrates a block diagram of an external extended device and a television device according to an exemplary embodiment.

With reference to FIG. 2A and FIG. 2B, as shown in FIG. 3, it illustrates a block diagram of an external extended device 310 and a television device 320 according to an exemplary embodiment.

The external extended device 310 includes a sound-mixing processing chip 311 and an integrated physical interface 312 (a male plug) electrically connected with the sound-mixing processing chip 311; and the television device 320 includes an integrated physical interface 321 (a female plug), a power amplifier circuit 322 and a speaker 323.

The external extended device 310 is connected with the integrated physical interface 321 of the television device 320 via the integrated physical interface 312 and receives power supplied and a signal transmitted by the television device 320.

The integrated physical interface may be a USB2.0 interface, a USB3.0 interface, a Type C interface or a lightning interface, etc.

The sound-mixing processing chip 311 is configured to acquire an accompaniment audio signal transmitted by the television device 320 via the integrated physical interface 321, and perform sound-mixing processing on a user voice signal gathered by the microphone device and the accompaniment audio signal.

The external extended device 310 receives the user voice signal gathered by the microphone device either wired or wirelessly. In some embodiments, the external extended device 310 may further include an audio input interface, and receive the user voice signal transmitted by the microphone device via the audio input interface.

When the user carries out Karaoke, the television device 320 transmits an accompaniment audio signal to the external extended device 310 via the integrated physical interface 321 between the television device 320 and the external extended device 310. After receiving the accompaniment audio signal, the external extended device 310 performs sound-mixing processing on the accompaniment audio signal and the user voice signal by means of the sound-mixing processing chip 311.

The sound-mixing processing chip 311 is further configured to transmit a sound-mixed signal to a power amplifier circuit of the television device via the integrated physical interface.

After performing sound-mixing processing on the accompaniment audio signal and the user voice signal, the sound-mixing processing chip 311 transmits the obtained sound-mixed signal to the power amplifier circuit 322 in the television device 320 via the integrated physical interface 312, and the television device 320 plays back the sound-mixed signal received by the power amplifier circuit 322 by means of the built-in speaker 323.

In a possible implementation, the integrated physical interface 312 of the external extended device 310 is a USB3.0 interface (a male plug), and correspondingly, the integrated physical interface 321 of the television device 320 also may be a USB3.0 interface (a female plug).

USB2.0 pins in the USB3.0 interface are configured to constitute a USB2.0 subinterface 3122, and USB3.0 pins in the USB3.0 interface (for example the remaining pins which are not USB2.0 pins) are configured to constitute an I2S subinterface 3121. The external extended device 310 receives the accompaniment audio signal transmitted by the television device 320 via the I2S subinterface 3121 and returns a sound-mixed signal to the television device 320 via the I2S subinterface 3121.

Specifically, as shown in FIG. 2B, a GND pin, a D− pin, a D+ pin and a VCC pin in the USB3.0 interface constitute the USB2.0 subinterface. An SS_RX+ pin, an SS_RX− pin, an SS_TX+ pin, an SS_TX− pin, and a GND_DRAIN pin in the USB3.0 interface constitute the I2S subinterface, and are respectively configured to transmit an SCK signal, a WS signal, an SD IN, an SD OUT and an MCLK signal.

When the television device 320 supports a UAC, the television device 320 may carry out signal transmission with the external extended device 310 not only via the I2S subinterface but also via the USB2.0 subinterface. In some embodiments, as shown in FIG. 3, the external extended device 320 further includes a bridge chip 313.

An end of the bridge chip 313 is electrically connected with the USB2.0 subinterface 3122, and another end of the bridge chip 313 is electrically connected with the sound-mixing processing chip 311.

The bridge chip 313 is configured to convert the USB accompaniment audio signal transmitted by the television device 320 via the USB2.0 subinterface 3122 into an I2S accompaniment audio signal, and transmit the I2S accompaniment audio signal to the sound-mixing processing chip 311.

The bridge chip 313 is configured to convert a USB signal into an I2S signal, or convert an I2S signal into a USB signal. After receiving the USB accompaniment audio signal transmitted by the television device 320 via the USB2.0 subinterface 3122, the bridge chip 313 converts the USB accompaniment audio signal into an I2S accompaniment audio signal, and transmits the I2S accompaniment audio signal obtained by conversion to the sound-mixing processing chip 311.

The sound-mixing processing chip 311 is configured to perform sound-mixing processing on the user voice signal and the I2S accompaniment audio signal.

The sound-mixing processing chip 311 performs sound-mixing processing on the user voice signal and the I2S accompaniment audio signal to obtain a corresponding sound-mixed signal.

As shown in FIG. 3, when the external extended device 310 uses the USB2.0 subinterface 3122 to return a sound-mixed signal, the sound-mixed signal needs to be transmitted through an AP 324 of the television device 320. After the AP 324 processes the sound-mixed signal, the sound-mixed signal is transmitted to the power amplifier circuit 322. If a signal is returned using this manner, a delay will be greatly increased, and thus the user experience is damaged. To reduce a transmission delay, in some embodiments, as shown in FIG. 3, the external extended device 310 further includes a Line Out interface or an SPDIF 314.

After processing and obtaining the sound-mixed signal, the sound-mixing processing chip 311 transmits the I2S sound-mixed signal to the external power amplifier via the Line Out interface or the SPDIF 314. After receiving the I2S sound-mixed signal, the external power amplifier plays the I2S sound-mixed signal back. In this way, a delay between singing by the user and playing the sound-mixed signal back may be significantly reduced.

In some embodiments, the sound-mixing processing chip 311 is further configured to transmit the I2S sound-mixed signal to the bridge chip 313.

The bridge chip 313 is further configured to convert the I2S sound-mixed signal into a USB sound-mixed signal, and transmit the USB sound-mixed signal to the AP 324 of the television device 320 via the USB2.0 subinterface 3122, wherein the AP is configured to save the USB sound-mixed signal as a recording.

In other possible implementations, the sound-mixing processing chip 311 also may return the user voice signal gathered by the microphone device merely to the bridge chip 313, which is not limited in this embodiment.

When the sound-mixing processing chip 311 transmits the I2S sound-mixed signal to the external power amplifier via the Line Out interface or the SPDIF 314, simultaneously, the sound-mixing processing chip 311 may also transmit the I2S sound-mixed signal to the bridge chip 313. After receiving the I2S sound-mixed signal, the bridge chip 313 converts the I2S sound-mixed signal into a USB sound-mixed signal, and transmits the USB sound-mixed signal to the AP 324 of the television device 320 via the USB2.0 subinterface 3122. After receiving the USB sound-mixed signal, the AP 324 saves the USB sound-mixed signal as a recording. When the user performs a replay operation, the AP 324 transmits the saved recording to the power amplifier circuit 322 and plays the recording by means of the built-in speaker 323.

In this embodiment, the bridge chip and the sound-mixing processing chip may be independently disposed chips. Or the bridge chip may be a chip integrated into the sound-mixing processing chip, which is not limited in the embodiments of the present disclosure.

Figure 4:
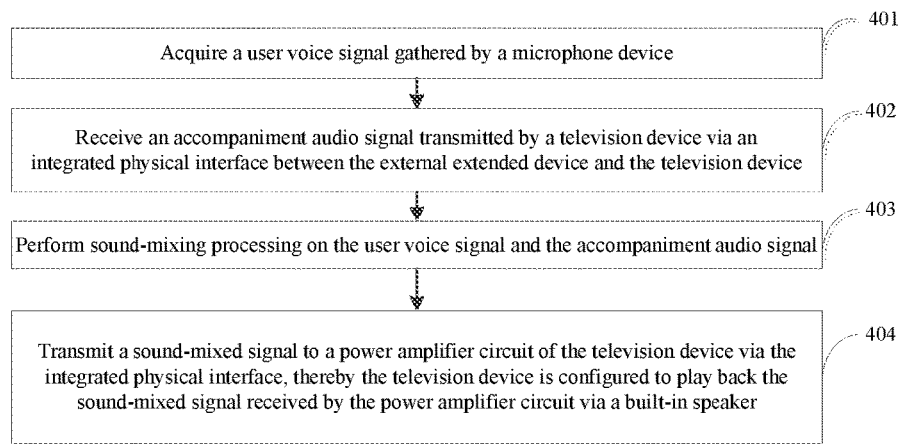
FIG. 4 illustrates a flowchart of an audio playback method according to an exemplary embodiment.

FIG. 4 illustrates a flowchart of an audio playback method according to an exemplary embodiment. In this embodiment, reference is made by taking an example in which the audio playback method is used in the external extended device 120 in FIG. 1. The audio playback method includes following steps.

In Step 401, a user voice signal gathered by a microphone device is acquired.

In Step 402, an accompaniment audio signal transmitted by a television device is received via an integrated physical interface between the external extended device and the television device.

In Step 403, sound-mixing processing is performed on the user voice signal and the accompaniment audio signal.

In Step 404, a sound-mixed signal is transmitted to a power amplifier circuit of the television device via the integrated physical interface, thereby the television device is configured to play back the sound-mixed signal received by the power amplifier circuit via a built-in speaker.

In conclusion, according to the audio playback method provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

Figure 5:
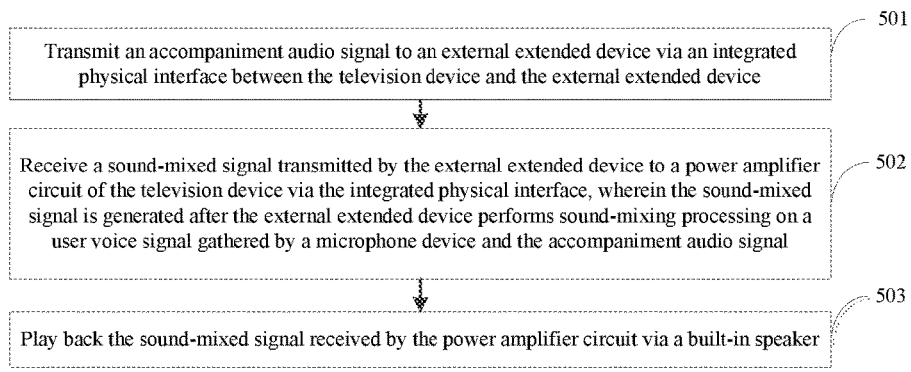
FIG. 5 illustrates a flowchart of an audio playback method according to another exemplary embodiment.

FIG. 5 illustrates a flowchart of an audio playback method according to another exemplary embodiment. In this embodiment, reference is made by taking an example in which the audio playback method is used in the television device 130 in FIG. 1. The audio playback method includes following steps.

In Step 501, an accompaniment audio signal is transmitted to an external extended device via an integrated physical interface between the television device and the external extended device.

In Step 502, a sound-mixed signal transmitted by the external extended device to a power amplifier circuit of the television device is received via the integrated physical interface, wherein the sound-mixed signal is generated after the external extended device performs sound-mixing processing on a user voice signal gathered by a microphone device and the accompaniment audio signal.

In Step 503, the sound-mixed signal received by the power amplifier circuit is played back via a built-in speaker.

In conclusion, according to the audio playback method provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

Figure 6A:
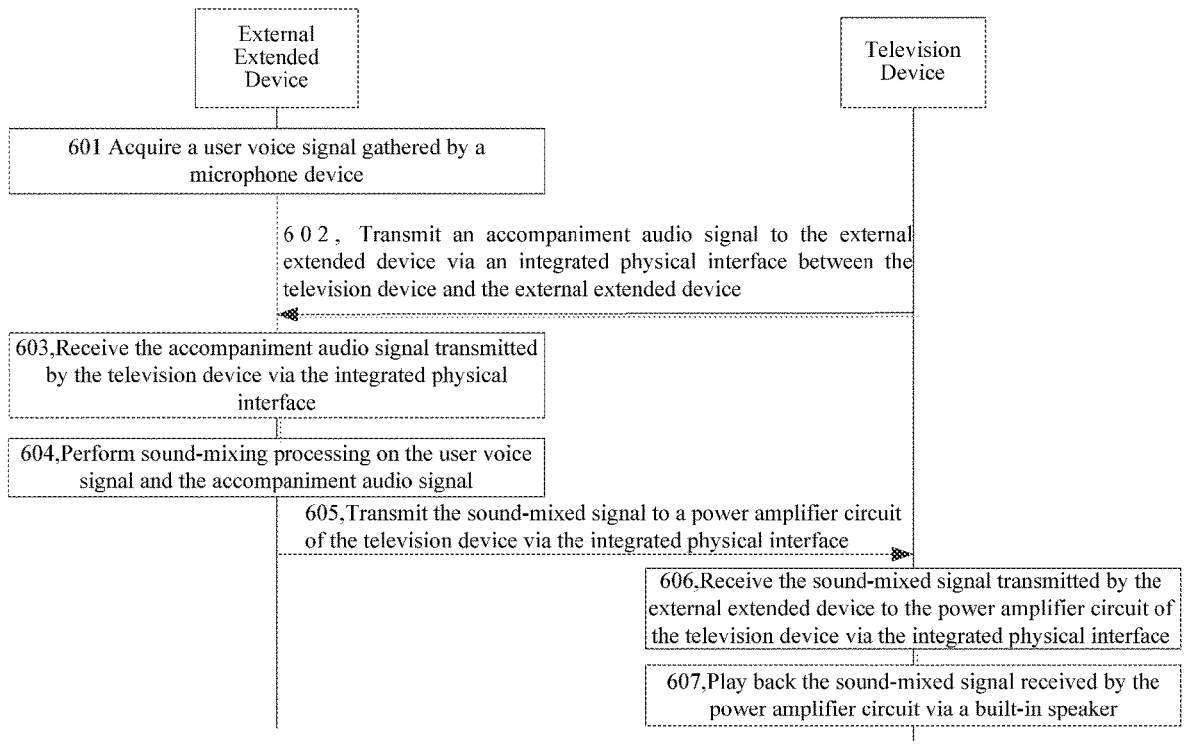
FIG. 6A illustrates a flowchart of an audio playback method according to still another exemplary embodiment.

FIG. 6A illustrates a flowchart of an audio playback method according to still another exemplary embodiment. In this embodiment, reference is made by taking an example in which the audio playback method is used in the audio playback system in FIG. 1. The audio playback method includes following steps.

In Step 601, an external extended device acquires a user voice signal gathered by a microphone device.

When the microphone device is a cable device such as a cable microphone, the external extended device acquires the user voice signal gathered by the microphone device though a cable between the external extended device and the microphone device. When the microphone device is a wireless device such as a wireless microphone, the external extended device acquires the user voice signal wirelessly. In this embodiment, a manner for acquiring a user voice signal by the external extended device is not limited.

In Step 602, a television device transmits an accompaniment audio signal to an external extended device via an integrated physical interface between the television device and the external extended device.

In a possible implementation, the integrated physical interface includes an I2S subinterface configured to transmit an I2S signal, and the television device transmits the accompaniment audio signal to the external extended device via the I2S subinterface in the integrated physical interface.

In Step 603, the external extended device receives the accompaniment audio signal transmitted by the television device via the integrated physical interface.

Correspondingly, the external extended device receives the accompaniment audio signal via the I2S subinterface in the integrated physical interface.

In Step 604, the external extended device performs sound-mixing processing on the user voice signal and the accompaniment audio signal.

Since a sound-mixing processing chip is built in the external extended device, after receiving the user voice signal and the accompaniment audio signal, the external extended device performs sound-mixing processing on the user voice signal and the accompaniment audio signal, and finally a corresponding sound-mixed signal is obtained.

In Step 605, the external extended device transmits the sound-mixed signal to a power amplifier circuit of the television device via the integrated physical interface.

Similar to transmitting the accompaniment audio signal by the television device, when the integrated physical interface includes the I2S subinterface, the external extended device directly transmits the sound-mixed signal to the power amplifier circuit of the television device via the I2S subinterface.

In Step 606, the television device receives, via the integrated physical interface, the sound-mixed signal transmitted by the external extended device to the power amplifier circuit of the television device.

Correspondingly, the television device receives, via the I2S subinterface, the sound-mixed signal transmitted by the external extended device to the power amplifier circuit.

In Step 607, the television device plays back the sound-mixed signal received by the power amplifier circuit via a built-in speaker.

Since the sound-mixed signal is directly transmitted to the power amplifier circuit without through the AP of the television device, the transmission delay is lower, namely, a time interval between singing by the user and playing the sound-mixed signal back is shorter (less than 30 ms), thereby a better user experience is achieved.

In conclusion, according to the audio playback method provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

In this embodiment, the external extended device directly transmits the sound-mixed signal to the power amplifier circuit of the television device via the I2S subinterface between the external extended device and the television device, and the sound-mixed signal is played back by the built-in speaker of the television device. In this way, returning the sound-mixed signal via the AP of the television device is avoided, thus a return delay is reduced and the user experience is improved.

The integrated physical interface (a female plug) on the television device not only may be connected with the external extended device but also may be connected with other external devices. When the television device is connected with the external extended device, the television device carries out signal transmission via the I2S subinterface and the external extended device. When the television device is connected with other external devices (for example, standard USB3.0 devices), corresponding pins of the I2S subinterface likely may be not configured to transmit the I2S signal.

Figure 6B:
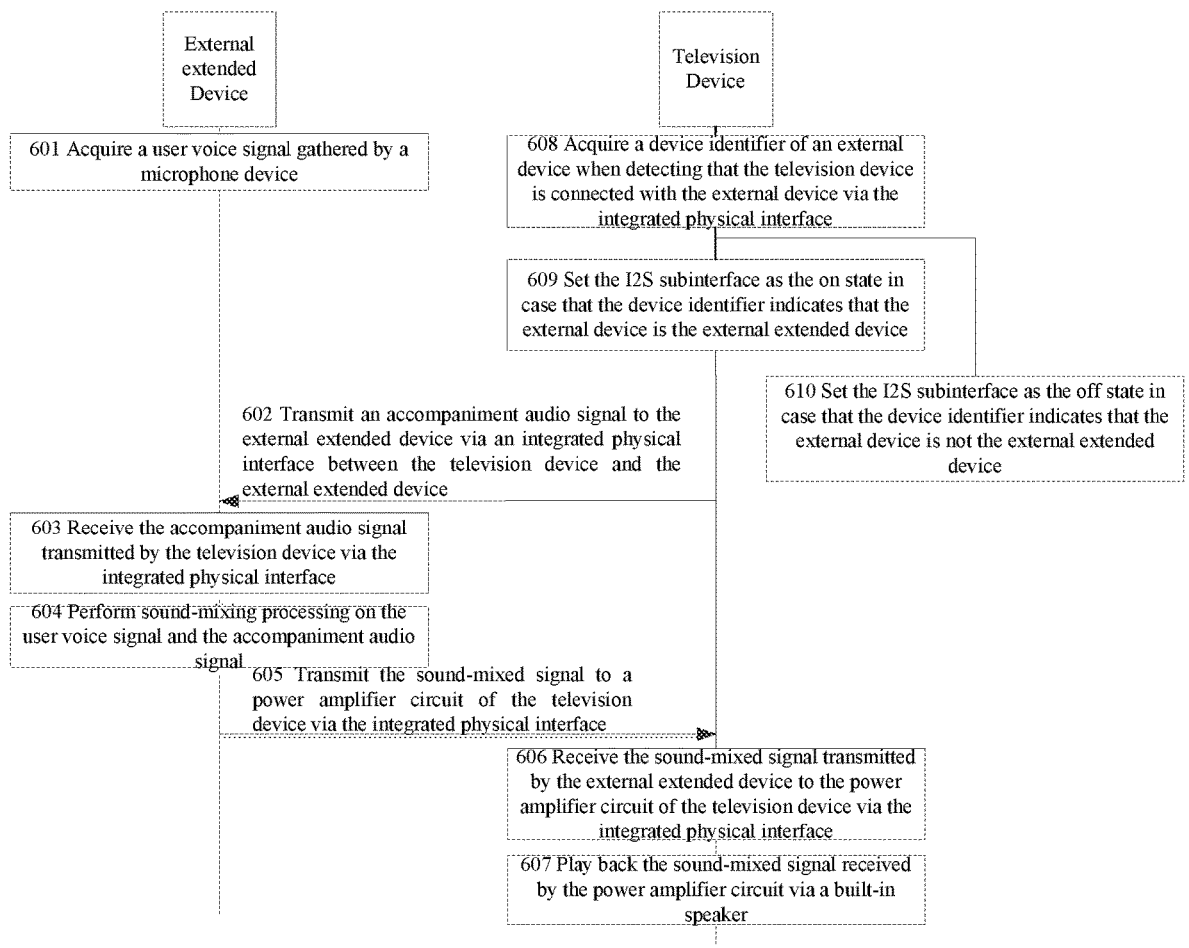
FIG. 6B illustrates a flowchart of an audio playback method according to still another exemplary embodiment.

Therefore, to avoid a signal transmission error and prevent the integrated physical interface from being damaged, in a possible implementation, the I2S subinterface in the integrated physical interface has an on state and an off state. When the television device is connected with the external extended device, the I2S subinterface is in the on state, and the I2S subinterface can transmit the I2S signal. When the television device is not connected with the external extended device, the I2S subinterface is in the off state, and the I2S subinterface prohibits transmitting the I2S signal. As shown in FIG. 6B, before the foregoing Step 602, following steps may be further included.

In Step 608, the television device acquires a device identifier of an external device when detecting that the television device is connected with the external device via the integrated physical interface.

Different types of external devices have different device identifiers. Therefore, the television device may determine whether an external device is the external extended device having Karaoke functions according to the device identifier of the external device.

In a possible implementation, after acquiring a device identifier, the television device detects whether the device identifier includes a keyword (for example Cara OK). The television determines the external device to be the external extended device when detecting that the device identifier includes a predefined keyword. The television determines the external device not to be the external extended device when detecting that the device identifier does not include the predefined keyword.

In Step 609, the television device sets the I2S subinterface as the on state in case that the device identifier indicates that the external device is the external extended device.

When detecting that the external device is the external extended device, the television device sets the I2S subinterface in the integrated physical interface as the on state, and transmits the accompaniment audio signal via the I2S subinterface, namely the Step 602 is executed.

In Step 610, the television device sets the I2S subinterface as the off state in case that the device identifier indicates that the external device is not the external extended device.

When detecting that the external device is not the external extended device, the television device may set a pin of the I2S subinterface as a high impedance state so that the I2S subinterface is in the off state, and I2S signal transmission is stopped.

Further, the television device may also switch the I2S subinterface according to a device type of the external device. For example, when the external device is a standard USB3.0 device, the television device may switch the I2S subinterface to a standard USB3.0 subinterface to ensure data transmission between the USB3.0 device and the television device, which is not limited in the present disclosure.

In this embodiment, the external device determines whether an external device is the external extended device according to the device identifier of the external device, and sets the I2S subinterface as the off state when the external device is not the external extended device, thereby avoiding a signal transmission error and preventing the integrated physical interface from being damaged.

Figure 6C:
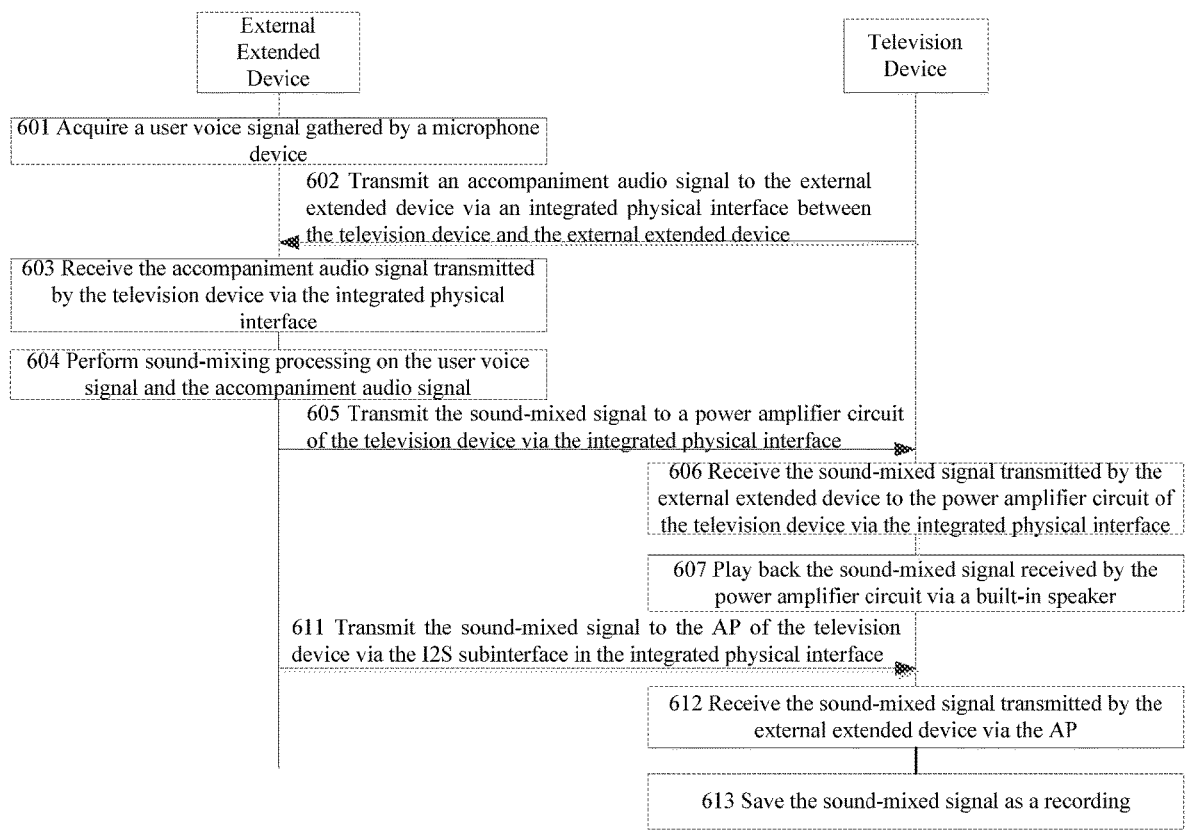
FIG. 6C illustrates a flowchart of an audio playback method according to still another exemplary embodiment.

In some embodiments, on a basis of FIG. 6A, as shown in FIG. 6C, after the foregoing Step 604, following steps may be further included.

In Step 611, the external extended device transmits the sound-mixed signal to the AP of the television device via the I2S subinterface in the integrated physical interface.

When transmitting the sound-mixed signal to the power amplifier circuit of the television device, the external extended device may also transmit the sound-mixed signal to the AP of the television device via the I2S subinterface. In other possible implementations, the external extended device also may return the user voice signal merely to the AP of the television device, which is not limited in this embodiment.

In Step 612, the television device receives the sound-mixed signal transmitted by the external extended device via the AP.

In Step 613, the television device saves the sound-mixed signal as a recording.

After receiving the sound-mixed signal, the television device saves the sound-mixed signal as a recording for replay. Meanwhile, the AP of the television device may also mark according to an intonation and a rhythm of the recording and display marking results, which is not limited in the present disclosure.

Figure 6D:
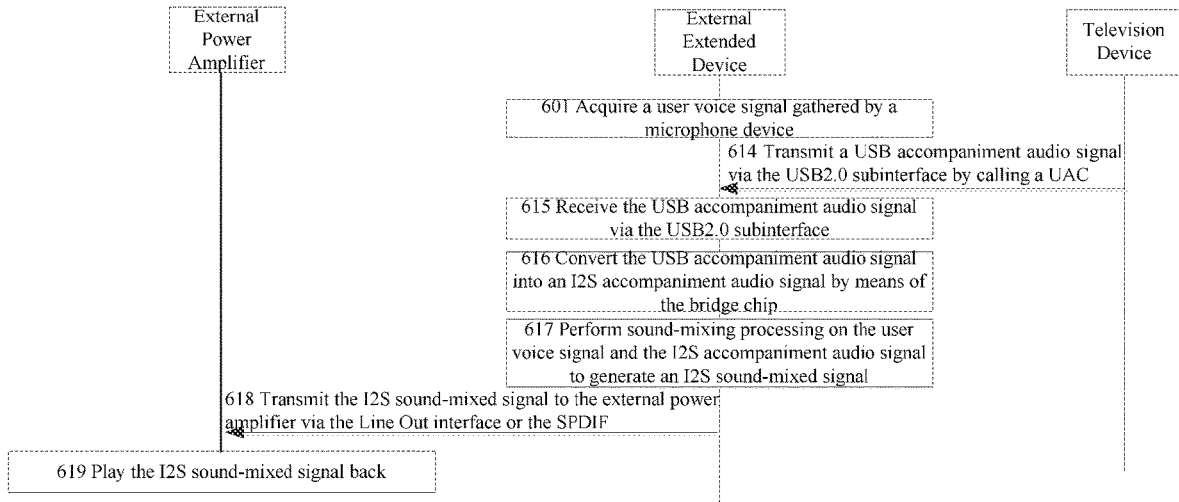
FIG. 6D illustrates a flowchart of an audio playback method according to still another exemplary embodiment.

In a possible implementation, the television device may also transmit an accompaniment audio signal to the external extended device via a USB2.0 subinterface in the integrated physical interface, and the external extended device may also play back the processed sound-mixed signal by means of the external power amplifier. As shown in FIG. 6D, when the integrated physical interface between the television device and the external extended device includes a USB subinterface, after the foregoing Step 601, following steps may be included.

In Step 614, the television device transmits a USB accompaniment audio signal via the USB2.0 subinterface by calling a UAC.

When the television device supports the UAC, the television device transmits the USB accompaniment audio signal to the external extended device via the USB2.0 subinterface.

In Step 615, the external extended device receives the USB accompaniment audio signal via the USB2.0 subinterface.

Correspondingly, the external extended device receives the USB accompaniment audio signal transmitted by the television device via the USB2.0 subinterface.

In Step 616, the external extended device converts the USB accompaniment audio signal into an I2S accompaniment audio signal by means of the bridge chip.

As shown in FIG. 3, the USB2.0 subinterface 3122 of the external extended device 310 is electrically connected with the bridge chip 313. When receiving the USB accompaniment audio signal, the external extended device converts the USB accompaniment audio signal into the I2S accompaniment audio signal by means of the bridge chip 313. This embodiment does not limit a type of the bridge chip.

In Step 617, the external extended device performs sound-mixing processing on the user voice signal and the I2S accompaniment audio signal to generate an I2S sound-mixed signal.

Similar to the foregoing Step 604, the external extended device performs sound-mixing processing on the I2S accompaniment audio signal obtained by conversion and the user voice signal to generate a corresponding I2S sound-mixed signal.

In Step 618, the external extended device transmits the I2S sound-mixed signal to the external power amplifier via the Line Out interface or the SPDIF.

To reduce a delay between singing by the user and playing the sound-mixed signal back, as shown in FIG. 3, the external extended device 310 transmits the I2S sound-mixed signal to the external power amplifier via the Line Out interface/SPDIF 314 so that the external power amplifier may play a mixed audio back.

In Step 619, the external power amplifier plays the I2S sound-mixed signal back.

In this embodiment, the television device transmits a USB accompaniment audio signal to the external extended device via the USB2.0 subinterface. The external extended device generates an I2S sound-mixed signal according to the USB accompaniment audio signal and the user voice signal, and plays the I2S sound-mixed signal back by means of the external power amplifier. In this way, a scope of application of the external extended device is broader, the delay between singing by the user and playing the sound-mixed signal back is reduced, and the user experience is improved.

Figure 6E:
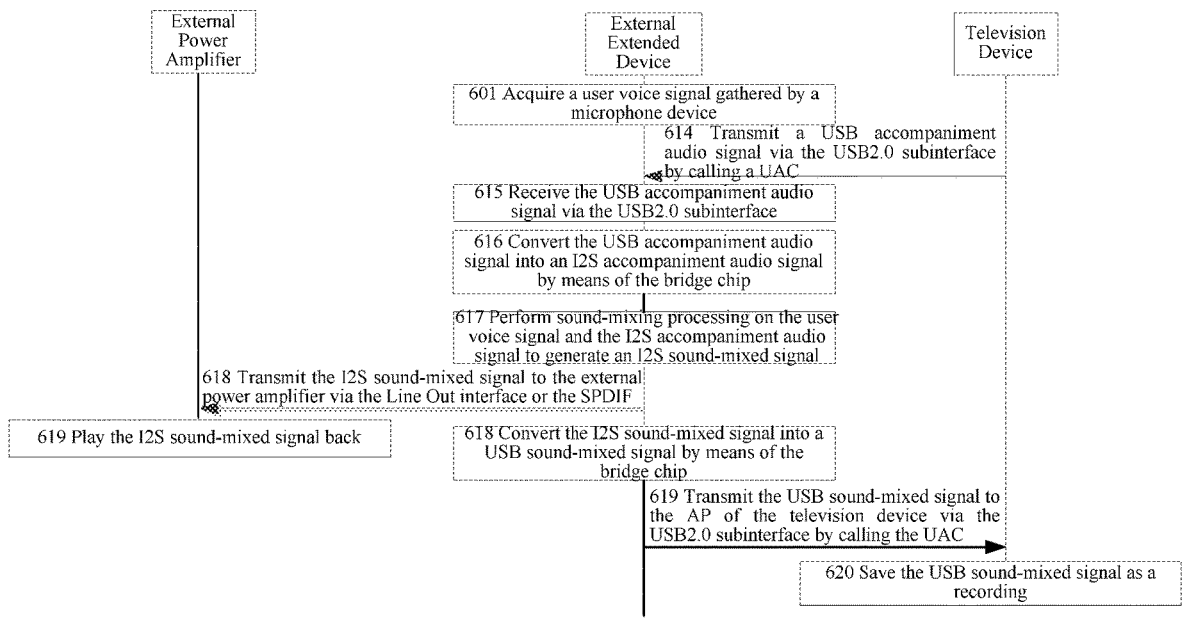
FIG. 6E illustrates a flowchart of an audio playback method according to still another exemplary embodiment.

In some embodiments, on the basis of FIG. 6D, as shown in FIG. 6E, after the foregoing Step 617, following steps may be further included.

In Step 618, the external extended device converts an I2S sound-mixed signal into a USB sound-mixed signal by means of the bridge chip.

As shown in FIG. 3, when the external extended device 320 transmits the I2S sound-mixed signal to the external power amplifier via the Line Out/SPDIF 314, simultaneously, the external extended device converts the I2S sound-mixed signal into a USB sound-mixed signal by means of the bridge chip 313.

The external extended device may also merely return the user voice signal to the AP of the television device, which is not limited in this embodiment.

In Step 619, the external extended device transmits the USB sound-mixed signal to the AP of the television device via the USB2.0 subinterface by calling the UAC.

Similar to transmitting the USB accompaniment audio signal by the television device, the external extended device transmits the USB sound-mixed signal obtained by conversion to the AP of the television device via the USB2.0 subinterface by calling the UAC.

In Step 620, the television device saves the USB sound-mixed signal as a recording.

The television device saves the received USB sound-mixed signal as a recording for replay. Meanwhile, the AP of the television device may also mark according to an intonation and a rhythm of the recording and display marking results, which is not limited in the present disclosure.

The following are apparatus embodiments of the present disclosure, which may be adopted to execute the method embodiments of the present disclosure. Please refer to the method embodiments of the present disclosure with regard to details not disclosed in the apparatus embodiments of the present disclosure.

Figure 7:
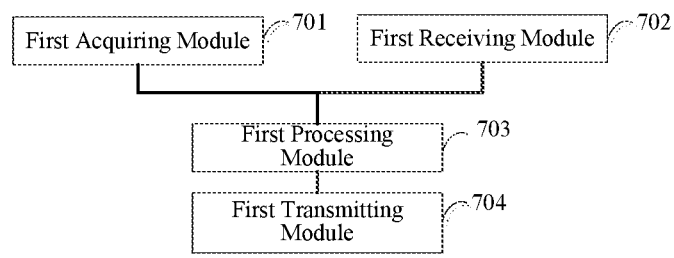
FIG. 7 illustrates a block diagram of an audio processing apparatus according to an exemplary embodiment.

FIG. 7 illustrates a block diagram of an audio processing apparatus according to an exemplary embodiment. The audio processing apparatus may be implemented as a whole or a part of the external extended device 120 in FIG. 1 by means of a dedicated hardware circuit or a combination of software and hardware, wherein the audio processing apparatus includes:

a first acquiring module 701, configured to acquire a user voice signal gathered by a microphone device;

a first receiving module 702, configured to receive an accompaniment audio signal transmitted by a television device via an integrated physical interface between the audio processing apparatus and the television device;

a first processing module 703, configured to perform sound-mixing processing on the user voice signal and the accompaniment audio signal; and a first transmitting module 704, configured to transmit a sound-mixed signal to a power amplifier circuit of the television device via the integrated physical interface, thereby the television device is configured to play back the sound-mixed signal received by the power amplifier circuit via a built-in speaker.

In conclusion, by using the audio processing apparatus provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

Figure 8:
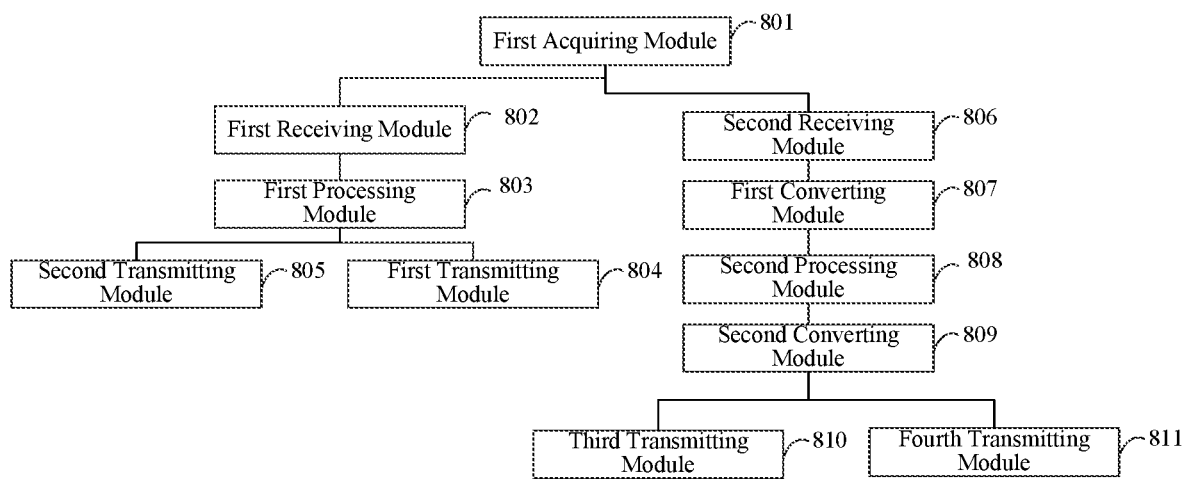
FIG. 8 illustrates a block diagram of an audio processing apparatus according to another exemplary embodiment.

FIG. 8 illustrates a block diagram of an audio processing apparatus according to another exemplary embodiment. The audio processing apparatus may be implemented as a whole or a part of the external extended device 120 in FIG. 1 by means of a dedicated hardware circuit or a combination of software and hardware, where the audio processing apparatus includes:

a first acquiring module 801, configured to acquire a user voice signal gathered by a microphone device;

a first receiving module 802, configured to receive an accompaniment audio signal transmitted by a television device via an integrated physical interface between the audio processing apparatus and the television device;

a first processing module 803, configured to perform sound-mixing processing on the user voice signal and the accompaniment audio signal; and a first transmitting module 804, configured to transmit a sound-mixed signal to a power amplifier circuit of the television device via the integrated physical interface, thereby the television device is configured to play back the sound-mixed signal received by the power amplifier circuit via a built-in speaker.

In some embodiments, the integrated physical interface includes an I2S subinterface, which is configured to transmit an I2S signal.

The first receiving module 802 is configured to receive the accompaniment audio signal transmitted by the television device via the I2S subinterface.

The first transmitting module 804 is configured to transmit the sound-mixed signal to the power amplifier circuit of the television device via the I2S subinterface.

In some embodiments, the integrated physical interface is a USB3.0 interface, USB2.0 pins in the USB3.0 interface are configured to constitute a USB2.0 subinterface, and USB3.0 pins in the USB3.0 interface (for example the remaining pins which are not USB2.0 pins) are configured to constitute the I2S subinterface.

The USB3.0 pins include a first pin, a second pin, a third pin, a fourth pin and a fifth pin.

The first pin is configured to transmit an SCK signal.
The second pin is configured to transmit a WS signal.
The third pin is configured to transmit an SD IN.
The fourth pin is configured to transmit an SD OUT.
The fifth pin is configured to transmit any one signal of an MCLK signal, the SD IN and the SD OUT.

In some embodiments, the apparatus further includes:
a second transmitting module 805, configured to transmit the sound-mixed signal to an AP of the television device via the I2S subinterface in the integrated physical interface, wherein the AP is configured to save the sound-mixed signal as a recording.

In some embodiments, the television device transmits a USB accompaniment audio signal via the USB2.0 subinterface by calling a UAC.

The apparatus further includes:
a second receiving module 806, configured to receive the USB accompaniment audio signal via the USB2.0 subinterface;
a first converting module 807, configured to convert the USB accompaniment audio signal into an I2S accompaniment audio signal by means of a bridge chip;
a second processing module 808, configured to perform sound-mixing processing on the user voice signal and the I2S accompaniment audio signal to generate an I2S sound-mixed signal;
a second converting module 809, configured to convert the I2S sound-mixed signal into a USB sound-mixed signal by means of the bridge chip; and
a third transmitting module 810, configured to transmit the USB sound-mixed signal to an AP of the television device via the USB2.0 subinterface by calling the UAC, wherein the AP is configured to save the USB sound-mixed signal as a recording.

In some embodiments, the external extended device is connected with an external power amplifier via a Line Out interface or an SPDIF.

The apparatus further includes:
a fourth transmitting module 811, configured to transmit the I2S sound-mixed signal to the external power amplifier via the Line Out interface or the SPDIF, wherein the external power amplifier is configured to play back the received I2S sound-mixed signal.

In conclusion, by using the audio processing apparatus provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

In this embodiment, the external extended device directly transmits the sound-mixed signal to the power amplifier circuit of the television device via the I2S subinterface between the external extended device and the television device, and the sound-mixed signal is played back by the built-in speaker of the television device. In this way, returning the sound-mixed signal via the AP of the television device is avoided, thus a return delay is reduced and the user experience is improved.

In this embodiment, the external device determines whether an external device is the external extended device according to the device identifier of the external device, and sets the I2S subinterface as the off state when the external device is not the external extended device, thereby avoiding a signal transmission error and preventing the integrated physical interface from being damaged.

In this embodiment, the television device transmits a USB accompaniment audio signal to the external extended device via the USB2.0 subinterface. The external extended device generates an I2S sound-mixed signal according to the USB accompaniment audio signal and the user voice signal, and plays the I2S sound-mixed signal back by means of the external power amplifier. In this way, a scope of application of the external extended device is broader, the delay between singing by a user and playing the sound-mixed signal back is reduced, and the user experience is improved.

Figure 9:
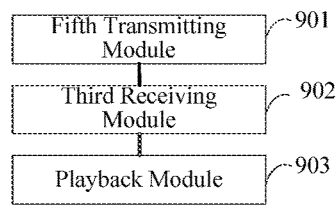
FIG. 9 illustrates a block diagram of an audio playback apparatus according to still another exemplary embodiment.

FIG. 9 illustrates a block diagram of an audio playback apparatus according to still another exemplary embodiment. The audio playback apparatus may be implemented as a whole or a part of the television device 130 in FIG. 1 by means of a dedicated hardware circuit or a combination of software and hardware, where the audio playback apparatus includes:
a fifth transmitting module 901, configured to transmit an accompaniment audio signal to an external extended device via an integrated physical interface between the audio playback apparatus and the external extended device;
a third receiving module 902, configured to receive a sound-mixed signal transmitted by the external extended device to a power amplifier circuit of the television device via the integrated physical interface, wherein the sound-mixed signal is generated after the external extended device performs sound-mixing processing on a user voice signal gathered by a microphone device and the accompaniment audio signal; and
a playback module 903, configured to play back the sound-mixed signal received by the power amplifier circuit via a built-in speaker.

In conclusion, by using the audio processing apparatus provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

Figure 10:
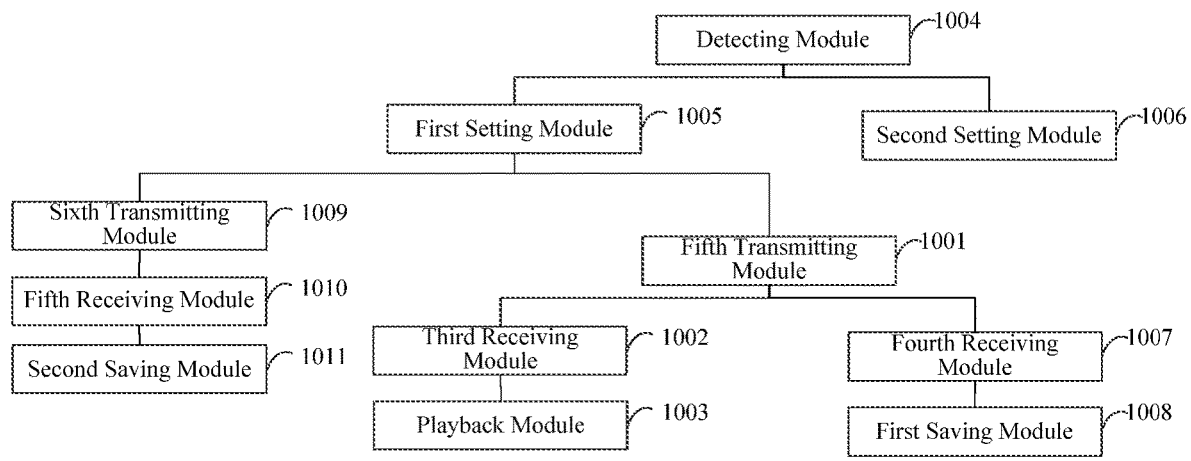
FIG. 10 illustrates a block diagram of an audio playback apparatus according to still another exemplary embodiment.

FIG. 10 illustrates a block diagram of an audio playback apparatus according to still another exemplary embodiment. The audio playback apparatus may be implemented as a whole or a part of the television device 130 in FIG. 1 by means of a dedicated hardware circuit or a combination of software and hardware, where the audio playback apparatus includes:

a fifth transmitting module 1001, configured to transmit an accompaniment audio signal to an external extended device via an integrated physical interface between the audio playback apparatus and the external extended device;

a third receiving module 1002, configured to receive a sound-mixed signal transmitted by the external extended device to a power amplifier circuit of the television device via the integrated physical interface, wherein the sound-mixed signal is generated after the external extended device performs sound-mixing processing on a user voice signal gathered by a microphone device and the accompaniment audio signal; and a playback module 1003, configured to play back the sound-mixed signal received by the power amplifier circuit via a built-in speaker.

In some embodiments, the integrated physical interface includes an I2S subinterface, which is configured to transmit an I2S signal; and the fifth transmitting module 1001 is configured to transmit the accompaniment audio signal to the external extended device via the I2S subinterface.

In some embodiments, the I2S subinterface has an on state and an off state; in the off state, the I2S subinterface prohibits transmitting the I2S signal.

The apparatus further includes:

a detecting module 1004, configured to acquire a device identifier of an external device when detecting that the audio playback apparatus is connected with the external device via the integrated physical interface;

a first setting module 1005, configured to set the I2S subinterface as the on state in case that the device identifier indicates that the external device is the external extended device; and a second setting module 1006, configured to set the I2S subinterface as the off state in case that the device identifier indicates that the external device is not the external extended device.

In some embodiments, the apparatus further includes:

a fourth receiving module 1007, configured to receive the sound-mixed signal transmitted by the external extended device via an AP; and a first saving module 1008, configured to save the sound-mixed signal as a recording.

In some embodiments, the integrated physical interface is a USB3.0 interface, USB2.0 pins in the USB3.0 interface are configured to constitute a USB2.0 subinterface, and USB3.0 pins in the USB3.0 interface (for example the remaining pins which are not USB2.0 pins) are configured to constitute the I2S subinterface.

The apparatus further includes:

a sixth transmitting module 1009, configured to transmit a USB accompaniment audio signal to the external extended device via the USB2.0 subinterface by calling a UAC;

a fifth receiving module 1010, configured to receive a USB sound-mixed signal transmitted by the external extended device via the USB2.0 subinterface, wherein the USB sound-mixed signal is obtained by converting an I2S sound-mixed signal by the external extended device by means of a bridge chip, the I2S sound-mixed signal is obtained by performing sound-mixing processing, by the external extended device, on the user voice signal and an I2S accompaniment audio signal, and the I2S accompaniment audio signal is obtained by converting the USB accompaniment audio signal by the external extended device by means of the bridge chip; and a second saving module 1011, configured to save the USB sound-mixed signal as a recording.

In conclusion, by using the audio processing apparatus provided by this embodiment, a sound-mixed signal is obtained by performing sound-mixing processing, by an external extended device, on a user voice signal gathered by a microphone device and an accompaniment audio signal transmitted by a television device; the sound-mixed signal is returned to a power amplifier circuit of the television device via an integrated physical interface between the external extended device and the television device; and the sound-mixed signal is played back by a built-in speaker of the television device. In this way, it avoids that it is costly to build a Karaoke processing chip in a television and it is disadvantageous to upgrade. Karaoke functions are integrated into the external extended device, a sound-mixed signal is generated by using the external extended device and returned to the television device, and finally the sound-mixed signal is played back by means of the built-in speaker of the television device. Thus, it is unnecessary to provide the Karaoke processing chip in the television device, a manufacturing cost is reduced, and it is convenient for a user to upgrade the Karaoke functions.

In this embodiment, the external extended device directly transmits the sound-mixed signal to the power amplifier circuit of the television device via the I2S subinterface between the external extended device and the television device, and the sound-mixed signal is played back by the built-in speaker of the television device. In this way, returning the sound-mixed signal via the AP of the television device is avoided, thus a return delay is reduced and the user experience is improved.

In this embodiment, the external device determines whether an external device is the external extended device according to the device identifier of the external device, and sets the I2S subinterface as the off state when the external device is not the external extended device, thereby avoiding a signal transmission error and preventing the integrated physical interface from being damaged.

In this embodiment, the television device transmits a USB accompaniment audio signal to the external extended device via the USB2.0 subinterface. The external extended device generates an I2S sound-mixed signal according to the USB accompaniment audio signal and the user voice signal, and plays the I2S sound-mixed signal back by means of the external power amplifier. In this way, a scope of application of the external extended device is broader, the delay between singing by a user and playing the sound-mixed signal back is reduced, and the user experience is improved.

With regard to the apparatus in the foregoing embodiments, concrete manners for executing operations by modules thereof have been described in detail in the embodiments related to the method, and thus are not elaborated herein.

Figure 11:
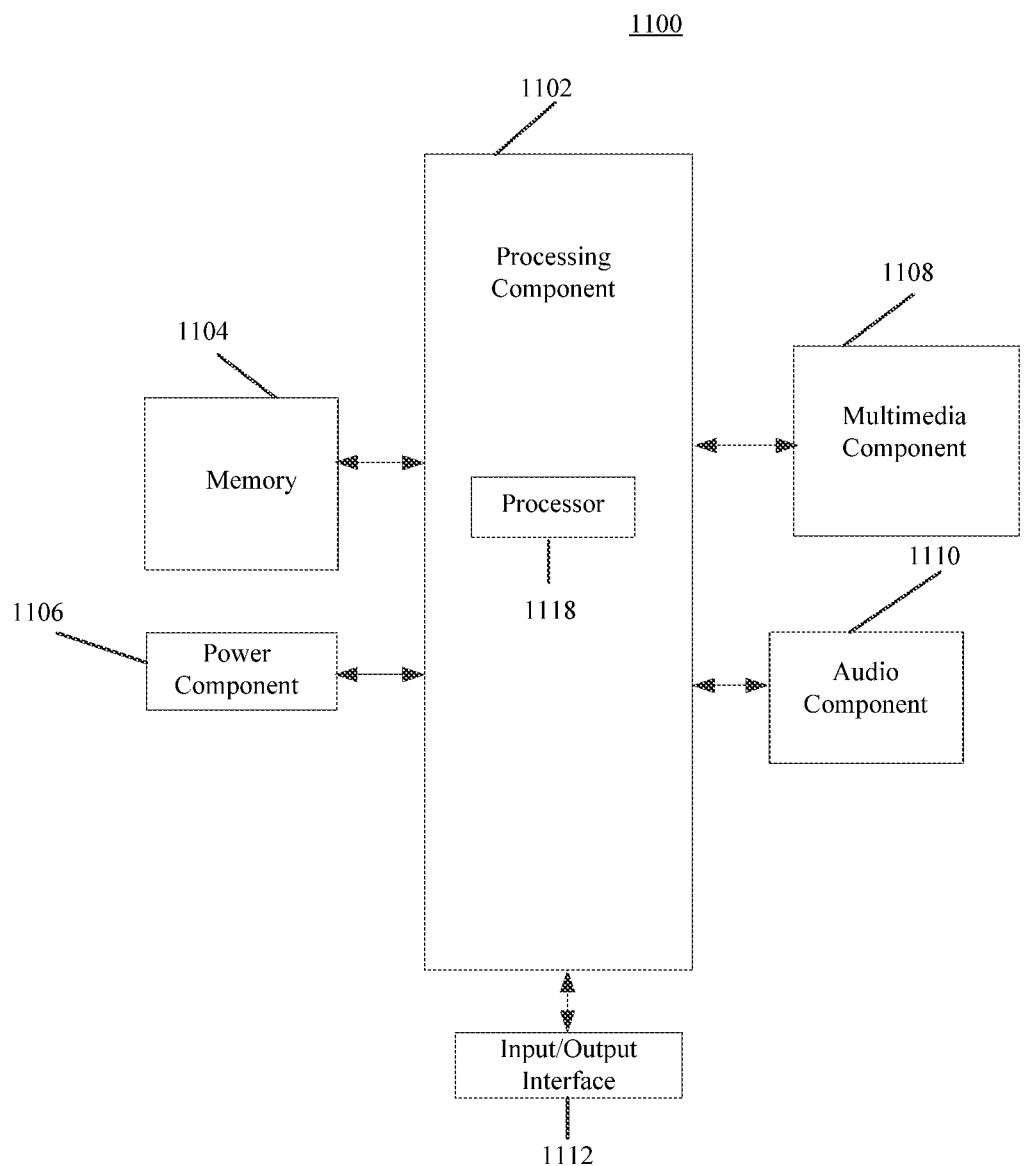
FIG. 11 is a block diagram of a television device according to an exemplary embodiment.

FIG. 11 is a block diagram of a television device according to an exemplary embodiment. For example, the television device 1100 may be a smart television.

Referring to FIG. 11, the television device 1100 may include one or more of the following components: a processing component 1102, a memory 1104, a power component 1106, a multimedia component 1108, an audio component 1110, and an input/output (I/O) interface 1112.

The processing component 1102 typically controls overall operations of the television device 1100. The processing component 1102 may include one or more processors 1118 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102. In this embodiment the processing component 1102 is an application processor (AP).

The memory 1104 is configured to store various types of data to support the operation of the television device 1100. Examples of such data include instructions for any applications or methods operated on the television device 1100. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the television device 1100. The power component 1106 may include a power management system, one or more power sources, and any other components associated with the generation, management, and distribution of power in the television device 1100.

The multimedia component 1108 includes a screen providing an output interface between the television device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1108 includes a front camera and/or a rear camera. The front camera and the rear camera may receive an external multimedia datum while the television device 1100 is in an operation mode, such as a photographing mode or a video mode. Each of the front camera and the rear camera may be a fixed optical lens system or have focus and optical zoom capability.

The audio component 1110 is configured to output and/or input audio signals. In this embodiment, the audio component 1110 includes a built-in speaker to output a sound-mixed signal.

The I/O interface 1112 provides an interface between the processing component 1102 and peripheral interface modules. In this embodiment, the I/O interface may be a USB2.0 interface, a USB3.0 interface, a Type C interface or a lightning interface, etc.

In exemplary embodiments, the television device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described information receiving methods In exemplary embodiments, there is also provided a non-transitory computer-readable storage medium including instructions, such as included in the memory 1104, executable by the processor 1118 in the television device 1100, for performing the above-described audio playback method. For example, the non-transitory computer-readable storage medium may be a ROM, a RAM, a CD-ROM, a magnetic tape, a floppy disc, an optical data storage device, and the like.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and embodiments be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An external device, configured to receive power supplied by a television device and a signal transmitted by the television device, the external device comprising:
   a USB 3.0 plug for connecting the external device to the television device, wherein a first set of pins of the USB 3.0 plug constitute an Inter-IC Sound (I2S) subinterface configured to transmit an I2S signal;
   a sound-mixing processing chip electrically connected with the USB 3.0 plug and configured to:
      acquire an accompaniment audio signal transmitted by the television device via the I2S subinterface;
      perform sound-mixing processing on a user voice signal gathered by a microphone device and the accompaniment audio signal to produce a sound-mixed signal; and
      transmit the sound-mixed signal to a power amplifier circuit of the television device via the I2S subinterface;
   wherein the sound-mixed signal is directly transmitted to the power amplifier circuit of the television device without passing through an application processor (AP) of the television device; and wherein a second set of pins of the USB3.0 plug constitute a USB2.0 subinterface.

2. The external device according to claim 1, wherein the first set of pins of the USB3.0 plug comprises:
a first pin configured to transmit a Serial Clock (SCK) signal;
a second pin configured to transmit a Word Selection (WS) signal;
a third pin configured to transmit a Serial Data Input (SD IN);
a fourth pin configured to transmit a Serial Data Output (SD OUT); and
a fifth pin configured to transmit any one signal of a Master Clock (MCLK) signal, the SD IN or the SD OUT.

3. The external device according to claim 2, further comprising:
a bridge chip comprising an end electrically connected with the USB2.0 subinterface and another end electrically connected with the sound-mixing processing chip, the bridge chip being configured to:
convert a format of the accompaniment audio signal transmitted by the television device via the USB2.0 subinterface from USB data format into I2S data format, wherein the accompaniment audio signal in I2S data format is an I2S signal indicative of accompaniment audios;
transmit the accompaniment audio signal in I2S data format to the sound-mixing processing chip for performing sound-mixing processing on the user voice signal and the accompaniment audio signal and transmitting the sound-mixed signal in I2S data format to the bridge chip, wherein the sound-mixed signal in I2S data format is an I2S signal indicative of mixed sounds;
convert a format of the sound-mixed signal from I2S data format into USB data format; and
transmit the sound-mixed signal in USB data format to the application processor (AP) of the television device via the USB2.0 subinterface, wherein the AP is configured to save the sound-mixed signal in USB data format as a recording.

4. The external device according to claim 3, further comprising a Line Out interface or a SONY/PHILIPS Digital Interface Format (SPDIF); wherein
the external device is configured to transmit the sound-mixed signal in I2S data format to an external power amplifier via the Line Out interface or the SPDIF.

5. An audio playback method, applied in an external device comprising a USB 3.0 plug having a first set of pins constituting an Inter-IC Sound (I2S) subinterface configured to transmit an I2S signal, and comprising:
acquiring a user voice signal gathered by a microphone device;
receiving an accompaniment audio signal transmitted by a television device via the I2S subinterface between the external device and the television device;
performing sound-mixing processing on the user voice signal and the accompaniment audio signal to produce a sound-mixed signal; and
transmitting, via the I2S subinterface, the sound-mixed signal to a power amplifier circuit of the television device for playing back the sound-mixed signal received by the power amplifier circuit via a built-in speaker;

wherein the external device is configured to receive power supplied by the television device and a signal transmitted by the television device;
wherein the sound-mixed signal is directly transmitted to the power amplifier circuit of the television device without passing through an application processor (AP) of the television device; and
wherein a second set of pins of the USB3.0 plug constitute a USB2.0 subinterface.

6. The method according to claim 5, wherein the first set of pins of the USB3.0 plug comprises:
a first pin configured to transmit a SCK signal;
a second pin configured to transmit a WS signal;
a third pin configured to transmit a SD IN;
a fourth pin configured to transmit a SD OUT; and
a fifth pin configured to transmit any one signal of a MCLK signal, the SD IN or the SD OUT.

7. The method according to claim 6, wherein the television device is configured to transmit the accompaniment audio signal in USB data format via the USB2.0 subinterface by calling a USB Audio Class UAC; and
wherein the method further comprises:
receiving the accompaniment audio signal in USB data format via the USB2.0 subinterface;
converting a format of the accompaniment audio signal from USB data format into I2S data format by a bridge chip, wherein the accompaniment audio signal in I2S data format is a I2S signal indicative of accompaniment audios;
performing sound-mixing processing on the user voice signal and the accompaniment audio signal in I2S data format to generate the sound-mixed signal in I2S data format, wherein the sound-mixed signal in I2S data format is a I2S signal indicative of mixed sounds;
converting the sound-mixed signal in I2S data format into the sound-mixed signal in USB data format by the bridge chip; and
transmitting the sound-mixed signal in USB data format to an AP of the television device via the USB2.0 subinterface by calling the UAC, wherein the AP is configured to save the sound-mixed signal in USB data format as a recording.

8. The method according to claim 7, wherein the external device is connected with an external power amplifier via a Line Out interface or a SPDIF; and
wherein the method further comprises:
transmitting, via the Line Out interface or the SPDIF, the sound-mixed signal in I2S data format to the external power amplifier for playing back the sound-mixed signal in I2S data format.

9. An audio playback method, applied in a television device and comprising:
transmitting an accompaniment audio signal to an external device, which comprises a USB 3.0 plug having a first set of pins constituting an Inter-IC Sound (I2S) subinterface configured to transmit an I2S signal, via the I2S subinterface between the television device and the external device;
receiving a sound-mixed signal transmitted by the external device to a power amplifier circuit of the television device via the I2S subinterface, wherein the sound-mixed signal is generated after the external device performs sound-mixing processing on a user voice signal gathered by a microphone device and the accompaniment audio signal; and
playing back the sound-mixed signal received by the power amplifier circuit via a built-in speaker;

wherein the external device is configured to receive power supplied by the television device and a signal transmitted by the television device;

wherein the sound-mixed signal is directly transmitted to the power amplifier circuit of the television device without passing through an application processor (AP) of the television device; and wherein a second set of pins of the USB3.0 plug constitute a USB2.0 subinterface.

10. The method according to claim 9, wherein the I2S subinterface has an on state and an off state, the I2S subinterface in the off state is prohibited from transmitting the I2S signal; and wherein the method further comprises:

detecting that the television device is connected with an peripheral device via a USB3.0 receptacle;

acquiring a device identifier of the peripheral device;

setting the I2S subinterface into the on state when the device identifier indicates that the peripheral device is the external device;

setting the I2S subinterface into the off state when the device identifier indicates that the peripheral device is not the external device.

11. The method according to claim 9, further comprising: saving the sound-mixed signal as a recording.

12. The method according to claim 9, wherein the method further comprises:

transmitting the accompaniment audio signal in USB data format to the external device via the USB2.0 subinterface by calling a USB Audio Class UAC; and receiving the sound-mixed signal in USB data format transmitted by the external device via the USB2.0 subinterface; and saving the sound-mixed signal in USB data format as a recording.

13. The method according to claim 12, wherein the sound-mixed signal in USB data format is obtained, via the external device, by:

converting a format of the accompaniment audio signal from USB data format into I2S data format, wherein the accompaniment audio signal in I2S data format is an I2S signal indicative of accompaniment audios;

performing sound-mixing processing on the user voice signal and the accompaniment audio signal in I2S data format to obtain the sound-mixed signal in I2S data format, wherein the sound-mixed signal in I2S data format is an I2S signal indicative of mixed sounds; and converting the sound-mixed signal in I2S data format.

* * * * *